April 13, 1965 E. AMEMIYA 3,177,750
APPARATUS FOR DISPENSING LENGTHS OF ADHESIVE TAPE HAVING
TIMING MEANS CONTROLLED BY VARIABLE RESISTANCES
Filed Oct. 15, 1962 2 Sheets-Sheet 1

Eiban Amemiya,
INVENTOR.

BY Wenderoth,
Lind and Ponack, attorneys

United States Patent Office 3,177,750
Patented Apr. 13, 1965

3,177,750
APPARATUS FOR DISPENSING LENGTHS OF ADHESIVE TAPE HAVING TIMING MEANS CONTROLLED BY VARIABLE RESISTANCES
Eibun Amemiya, 16 Nakamarucho, Itabashi-ku, Tokyo, Japan
Filed Oct. 15, 1962, Ser. No. 230,513
Claims priority, application Japan, Oct. 21, 1961, 36/37,804
4 Claims. (Cl. 83—241)

The present invention relates to apparatus for automatically dispensing lengths of adhesive tape such as wet glued tape or pressure-sensitive adhesive tape, and is intended to provide such apparatus adapted for use in sealing a row of cartons or the like on a conveyorized packing line and capable of dispensing tape strips of a predetermined length or lengths at high speed. The present invention thus has for its primary object to provide an apparatus of the character operable by switch operation alone to automatically pay out the tape, cut it successively into measured lengths and deliver them for sealing use.

A tape dispensing apparatus has previously been in wide use which includes a supply of tape on a reel journaled in the frame of the apparatus so that the tape may be manually gripped at its end and pulled out or may be paid out over a delivery roller by rotating the roller by manual operation of a crank lever connected therewith. The apparatus also includes a cutter blade arranged adjacent to the delivery opening for biasly cutting the tape paid or pulled out by applying the tape to the blade edge. The conventional apparatus is rather simple in construction but requires substantial time and labor for preparation of tape strips of required lengths before actual sealing operation and thus cannot be used efficiently on any continuous packaging line.

The inventive apparatus is characteristically operable by simple pushbutton operation automatically to pay out the tape and cut it to a required length for use. The apparatus may be adapted for dual delivering operation or may be made operable to selectively deliver two lengths of tape corresponding to the lengths of two sealing areas of a carton, for example, the longitudinal and transverse dimensions thereof.

Basically, the inventive apparatus comprises a power drive rotatable at a constant speed, a tape pay-out or delivering mechanism, means for transmitting the torque from the power drive for a predetermined period of time to the pay-out mechanism, and a cutter device adapted to actuate the cutting blade to cut the tape paid out to a required length at the end of said predetermined time period. Thus, the apparatus according to the present invention is provided with a rotary power drive such as an electric motor, a clutching mechanism for connecting and disconnecting the pay-out to and from the power drive, a mechanism for lifting and releasably holding the cutter blade, and a timing mechanism in addition to those elements conventionally employed in previous tape dispensers.

It will be understood that a suitable electric motor directly connected with the pay-out of delivery roller of the pay-out mechanism may serve the same purpose as a continuously rotating motor connected with the pay-out mechanism by way of a clutching mechanism and thus eliminates the need of such special start-stop mechanism.

The timing mechanism employed in the inventive dispensing apparatus is preferably an electric timing mechanism operable upon the basis of the charging characteristics of a C-R circuit. This mechanism includes an electromagnet serving as a control element and is highly desirable in that the time setting is readily adjustable and a convenient changeover mechanism for dual operation can readily be incorporated.

The clutching mechanism may take the form of a pressure roller type clutch while the cutter blade lifting and holding mechanism is preferably electromagnetic employing an electro-magnetic force for lifting and holding the cutter blade. It will be recognized that the operations of these two mechanisms may readily be coordinated by providing appropriate timing means.

In brief, the tape dispensing apparatus of the present invention is arranged so that the tape length paid out in each dispensing operation is determined by the rotation speed of a constant speed motor and the time setting, and utilizes in combination an electric drive power for paying out the tape, electromagnetic operation of the cutter blade and the electrical controlling characteristics of a C-R type electric timer mechanism. It will be appreciated that the inventive apparatus is simple in construction and highly automatic in operation.

The above and other objects, features and advantages of the present invention will become apparent from the following detailed description when taken in conjunction with the accompanying drawings, in which.

Figure 1:
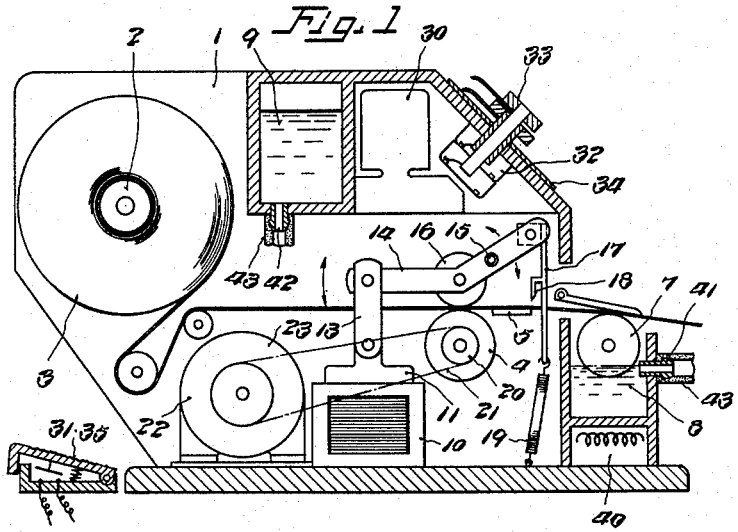
FIG. 1 is a schematic longitudinal cross-sectional view of a tape dispensing apparatus embodying the present invention.

Referring to the drawings, and particularly to FIG. 1, the apparatus shown includes a machine frame 1 and a tape roll shaft 2 mounted in the rear portion thereof. A constant-level water reservoir 8 is provided in the forward portion of the frame 1 and a wetting roller 7 is horizontally mounted in said reservoir 8 with the top portion of the roller extending above the level therein. A cutting table 5 and a pay-out or delivery roller 4 are provided in the interior of the frame adjacent to each other. A cutter bar 17 carrying a cutter blade 18 is arranged vertically in opposing relation to said cutting table 5 with a tension spring 19 secured to the bottom end of said cutter bar 17 to urge the latter generally downward.

A rock lever 14 is connected at one end with the top of said cutter bar 17 and at the other end with the plunger 11 of a solenoid 10 by way of a connecting link 13. The rock lever 14 is a bell crank lever pivoted as at 15. A pressure roller 16 is rotatably mounted on the rock lever between the pivotal connection 15 and the other end of the rock lever in opposing relation to the pay-out roller 4. A belt pulley 20 is mounted fast on the shaft of the pay-out roller 4 and is drivingly connected with a drive pulley 23 on the shaft of a drive motor 22 by way of a belting 21.

A timing mechanism 30 and an enclosed water reservoir 9 are mounted in side-by-side relation in the upper portion of the frame 1. Mounted on the front of the frame is a variable resistor or variohm 32 for obtaining an adjustable time setting with the timing mechanism. The constant-level water reservoir 8 is formed with an inlet opening 41 at a level such as to keep the bottom side of the wetting roller 7 wetted at all times. Formed in the bottom of the enclosed water reservoir 9 is an outlet 42 which communicates with the inlet 41 of the constant-level reservoir 8 by way of a conduit 43 so that the constant-level reservoir 8 is replenished from time to time from the enclosed reservoir 9 to maintain the level in the former. A heating device 40 is attached to the constant-level water reservoir 8 to expedite the wetting or impregnating effect of water therein as required.

A start switch 31 for the timing mechanism 30 as well as a free pay-out switch 35 for energizing the solenoid 10 independently of the setting of the timing mechanism is conveniently arranged exteriorly of the frame for remote-controlling the apparatus and preferably takes the form of a foot-operated switch. In use, the drive motor and the wetting water heating device are kept energized so that the delivery roller 4 rotates continuously and the wetting water in the constant-level reservoir is kept at a suitable elevated temperature. The tape 3 is threaded through the apparatus so that in operation it leaves the supply roll on the shaft 2 and passes between the delivery roller 4 and pressure roller 16 and over the cutting table 5 and the wetting roller 7 to be delivered outside of the apparatus. The variable resistor 32 has an indicator dial 33 connected therewith for cooperation with a plate 34 carrying a length scale to indicate the tape length to be delivered in each dispensing operation.

In operation of the apparatus, the start switch 31 for the timing mechanism 30 is operated by foot to initiate energization of the solenoid 10, which is kept energized during the time period as set in the timing mechanism. Upon such energization of the solenoid 10, the movable iron cove or plunger 11 thereof is electromagnetically pulled in to rotate the rock lever 14 counterclockwise about the fulcrum 15 by way of the link 13 so that the pressure roller 16 is pressed against the delivery roller 4. At the same time, the cutter bar 17 connected with the rock lever 14 is lifted to swing the cutting blade 18 to its upper position. As a result, the tape is gripped between the pressure roller 16 and the pay-out roller 4 and delivered forwardly with the rotation of the pay-out roller owing to the increased friction between the tape and the delivery roller 4. It is to be noted that the tape is engaged by the wetting roller 7 to be coated with water or glue before it runs out of the apparatus. Upon termination of the time set in the timing mechanism 30, the circuit for energizing the solenoid 10 is automatically opened to allow the plunger 11 to be restored to its upper position under the bias of the tension spring 19 acting upon the plunger by way of cutter lever 13, rock lever 14 and link 13. At the same time, the pressure roller 16 carried by the rock lever 14 is moved apart from the pay-out roller 4 reducing the friction between the tape and the pay-out roller 4 and ceases to rotate. Also, upon deenergization of the solenoid 10, the cutter bar 17 is lowered so that the cutter blade 18 carried thereby cooperates with the cutting table 5 to cut the tape 3 to furnish a tape strip of the required length.

The foot-operated switch for the timing mechanism serves just to start the operation thereof as described hereinafter in more detail in connection with the electric circuit and therefore should take the form of a pushbutton switch. The pushbutton switch is preferably arranged so that any repetitive operation of the apparatus is effectively prevented, for example, by electrical means as described hereinafter, even if the pushbutton be inadvertently kept depressed beyond the time limit set in the timing mechanism. Further, it is desirable that the operator can repeatedly operate the start switch for repeating the dispensing operation while being fully conscious thereof. It is preferable that the start switch is arranged so that not only it produces a single starting pulse only when it is kept depressed but it never operates again unless the pushbutton is once released and depressed again.

To meet these requirements, a start switch of the following construction is employed according to the present invention.

Figure 2:
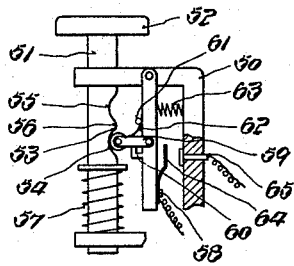
FIG. 2A is a schematic cross-sectional view of the switch mechanism for preventing inadvertent repetitive operation of the apparatus.
FIG. 2B is a view similar to FIG. 2A of the switch mechanism in closed position.
Figure 2:
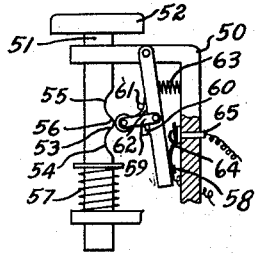

Referring to FIGS. 2A and 2B, the switch includes a casing 50 and a pushbutton in the form of an actuator rod 51 extending through the casing for vertical sliding movement. The actuator rod 51 has an enlarged head 52 formed at the top and a camming surface 56 formed on one side intermediate the ends. The camming surface 56 includes two spaced apart recesses 54 and 55 and a relatively sharp projection 53 interposed therebetween. The actuator rod 51 is formed adjacent to the bottom with a radially extending flange to receive a compression spring 57 at its top. The compression spring is supported at the bottom by the adjacent wall of the switch casing 50 and, encircling the bottom portion of the actuator rod, acts to urge the latter resiliently upwardly. A rocker lever 58 is pivoted to the top wall of the switch casing to depend therefrom. A follower arm 59 is pivotally secured to said rocker lever 58 intermediate the ends thereof and carries a follower roller 62 at the free extremity. As shown, the follower arm 59 is normally resiliently held in horizontal position by means of a support abutment 60 and a leaf spring 61 both carried by the rocker lever 58 so as to allow forced swing of the follower arm only in the upward direction. The roller 62 on the follower arm 59 is normally pressed against the camming surface 56 under the bias of a compression spring 63 interposed between the rocker lever 58 and the adjacent wall of the switch casing. An electric contact 65 is arranged on the casing wall opposite to a cooperating electric contact 64 mounted on the rocker lever 58.

With such arrangement, when the actuator rod 51 is lowered under pressure applied onto the head portion 52 thereof, the follower roller 62 normally held in contact with the lower recess 54 in the camming surface 56 is first placed into contact with the projection 53 thereon to rock the rocker lever 58 counterclockwise thereby bringing the contact 64 on the lever into electrical contact with the contact 65 on the adjacent casing wall (see FIG. 2B). Upon continued descent of the actuator rod to its lowest position, the roller 62 comes into contact with the upper recess 55 in the camming surface 56 to allow the rocker lever 58 to be restored to its normal position so that the contacts 64 and 65 are moved apart from each other. Thus, as the actuator rod is moved from its normal or uppermost position to its lowermost position, the contacts are closed only when the roller 62 is in contact with the projection 53 and again opened when the rod reaches its lowermost position. When the actuator rod 51 is released to be restored to its normal position, the follower roller 62 previously in contact with the upper recess 55 is first swung upward by the projection 53 without rocking the rocker lever and then passes over the projection 53 into the lower recess 54. Thus, during the upward stroke of the actuator rod 51, the contacts 64 and 65 are never brought into contact with each other.

Description will now be made on the electrical arrangement upon which the present invention relies for the controlling of the machine operation.

Figure 3:
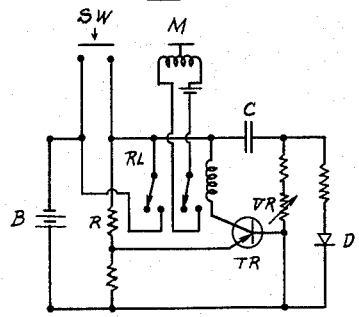
FIG. 3 is a schematic diagram of the basic electric circuit of the apparatus shown in FIG. 1.

First, the basic electric circuit will be described with reference to FIG. 3. The circuit principally includes a C=R circuit in which the charging current to the capacitor C is controlled by the variable resistor VR, and a relay RL for starting and stopping the current for energizing a solenoid M to be controlled or for starting and stopping a drive motor, said relay RL being operable for a predetermined period of time upon the basis of the charging characteristics of the capacitor C. A transistor TR is arranged in this circuit so that the relay RL is effectively operated by variation of the charging current, which is amplified by the transistor TR. The relay RL is a two-circuit relay, one circuit of which is used in energizing the solenoid M or in starting and stopping the motor, and the other circuit of which is used for the shelf-holding of the power source circuit. A resistor R and a diode D are connected in parallel with the power source B and the resistor VR, respectively, of the charging circuit to form a discharging circuit so that the changeover from charging to discharging is instantaneously effected when the charging circuit is opened. In more detail, upon momentary closing of the switch SW, a voltage is applied to the collector of the transistor TR and at the same time a current flows through the R-C charging circuit applying a voltage to the base of the transistor TR. Accordingly, a current is produced to energize the relay RL and the contacts therein are closed to energize the solenoid M. Simultaneously with this, the self-holding contacts in the relay RL are closed to allow the charging circuit to continue to charge the capacitor. The switch thus completes its starting function and is not required to be kept depressed any longer. As the charging period elapses, the charging current decreases according to the charging characteristics of the C-R circuit so that the base voltage and hence the collector current are diminished. When the collector current is reduced below the minimum value for holding the relay contacts closed, the relay contacts for the solenoid are opened to deenergize the latter and at the same time the shelf-holding contacts for the charging circuit are opened so that the discharge circuit C-D-R operates immediately to discharge the capacitor.

As described above, this timing circuit is started by momentarily closing the start switch and then held closed by itself to keep the charging circuit effective until the set time has elapsed. It will be appreciated therefore that the circuit once started can never be re-started ensuring that precisely a predetermined length of tape is paid out. Further, since the self-holding circuit is opened upon expiration of the set time allowing the discharging circuit to automatically start to operate, the entire timing arrangement is immediately reset preparatory to the next time-set operation.

Having described the basic electric circuit, description will now be made of the integrated electrical circuitry intended to function not only as a mere timing circuit for allowing the apparatus to operate to deliver a predetermined length of time, but also as a dual device enabling the apparatus to deliver any desired length of tape as well as to operate under control of the timing circuit to deliver said predetermined tape length. To this end, the entire circuitry as illustrated in FIG. 4 includes an ingenious combination of relays, a parallel arrangement of a free-delivery circuit, a changeover device for selecting two time settings in the timing circuit and a safety device for prevention of misoperation of the apparatus for the purpose of increasing the versatility of the inventive tape-dispensing apparatus upon the basis of the controlling function of the timing circuit.

Figure 4:
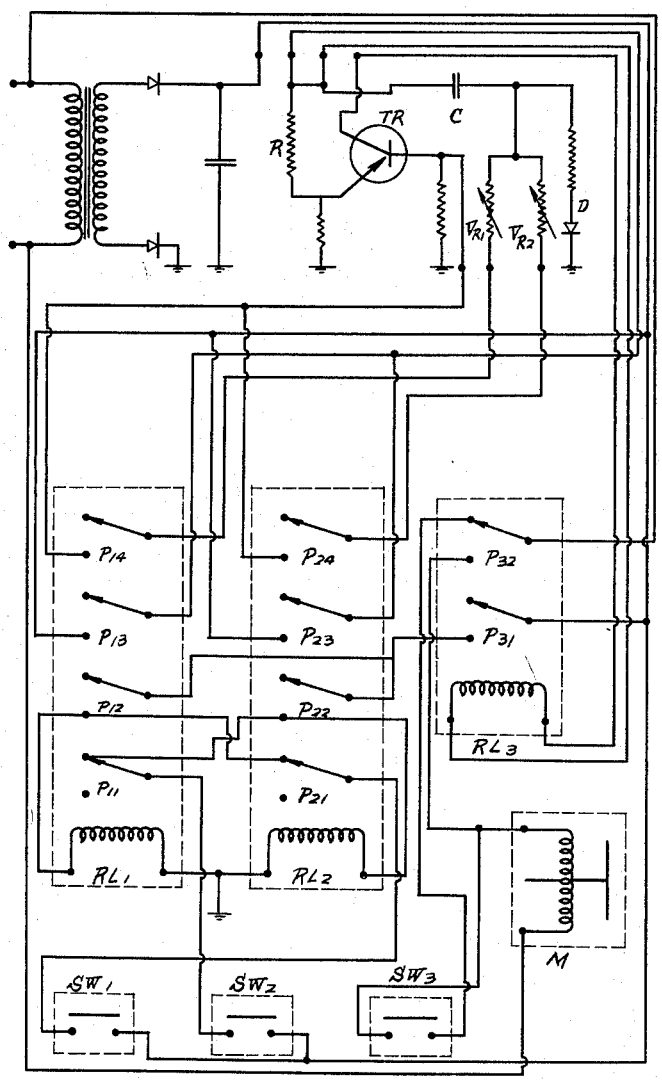
FIG. 4 is a diagram of the integrated, electrical circuit of the apparatus.

As shown in FIG. 4, the integrated circuit includes two parallel-connected variable resistors $VR_1$ and $VR_2$ in place of the single variable resistor VR employed in the above described basic circuit for time setting. Four-circuit relays $RL_1$ and $RL_2$ are connected respectively to said variable resistors $VR_1$ and $VR_2$ providing for switching therebetween and hence for switching between self-holding circuits as well as between starting power inputs while preventing misconnection between the lines. The variable resistors are also arranged in combination with a two-circuit relay $RL_3$ for energization of a solenoid and for the self-holding of a charging circuit as described hereinafter in more detail. The circuit including a free-delivery switch $SW_3$ provided for direct energization of the solenoid, which is to be controlled, is arranged in parallel with the circuit including a timing mechanism, and the solenoid contacts of the two-circuit relay $RL_3$ are employed for the switching between these two parallel circuits thereby preventing double or simultaneous operation of the circuits.

The integrated electrical circuit operates as follows. Upon closing the switch $SW_1$, a current is produced flowing through contacts $P_{21}$, which prevents misoperation of the apparatus upon another time setting, to energize the coil of the relay $RL_1$ thereby to shift its movable contacts downward. The closing of the contacts $P_{14}$ closes the timing circuit including variable resistor $VR_1$ to start operation of the timing mechanism, the contacts $P_{13}$ being closed simultaneously with the contacts $P_{14}$. Even if the switch SW is then opened, the time-set operation is never interrupted inasmuch as the contacts $P_{31}$ of the timing circuit relay $RL_3$ and the contacts $P_{12}$ of the energizing relay $RL_1$ together form a self-holding circuit. Moreover, the contacts $P_{32}$ of the timing circuit relay $RL_3$ are switching contacts effective to prevent double operation of the time and free-delivery circuits. It will be recognized that, after the timing circuit has once been started by the operation of the switch $SW_1$, any misoperation cannnot occur owing to the arrangement of contacts $P_{32}$ and $P_{11}$, even if the remaining two switches $SW_2$ and $SW_3$ be operated, and thus the time setting cannot be disturbed nor interruped ensuring that the apparatus operates precisely as initially set.

The circuit operation when the switch $SW_2$ is closed is substantially the same. Namely, in this case, the relay $RL_2$ connected to the variable resistor $VR_2$ is operated to conduct current to the solenoid M for a period of time as determined by the setting of the variable resistor $VR_2$, the remaining switches $SW_1$ and $SW_2$ being effective to prevent any misoperation.

Being constructed as described above, the inventive apparatus is operable to automatically deliver tape strips of a desired length accurately and without the danger of misoperation simply by repeating the "one-touch" operation of a simple switch device and thus is a machine which is highly efficient and suitable particularly for use on a conveyorized packing line, as will readily be appreciated. In addition, the length of the tape strips, each delivered automatically under the direction producted by the one-touch operation of the switch device, may readily be varied as desired by a simple dial operation, and such variation in length of tape delivered each time of switch operation is continuous. The inventive apparatus is thus readily adjustable to suit any size of cartons complying with the switchover of the packaging line.

Moreover, the tape may be cut, and delivered in two lengths corresponding to the longitudinal and transverse dimensions of the cartons as desired by selectively operating two start switches. This eliminates the need of providing two tape-dispensing units for sealing cartons having two different dimensions and hence requiring tape strips of two different lengths and thus reduces the packaging cost. The inventive apparatus is also advantageous in that it can deliver tape strips of any desired length differing from the length or lengths previously set on the machine as required by depressing the free-delivery switch for a period of time corresponding to the desired tape length.

A further advantage of the apparatus is that it is simple to operate and free from any misoperation such as of delivering tape strips of wrong length because of its foolproof arrangement effective to completely prevent any inadvertent repetitive operation as well as double or medley operation of the apparatus. It will also be appreciated that the use of an electric timing mechanism operable upon the basis of the charging characteristics of a C-R circuit according to the present invention makes it readily feasible to provide different safety devices utilizing the controlling characteristics of the timing mechanism as well as to effect variation of the time setting simply by adjusting the variable resistance. Also, two time settings for paying out tape strips of two different lengths may be obtained easily without the need of two timing mechanisms simply by providing two readily switchable variohm circuits. The arrangement in which the discharging circuit is automatically closed upon opening of the self-holding charging circuit allows the inventive apparatus to effect repetitive operation without use of any resetting element like one required in a mechanical timing mechanism. In addition, the apparatus is simple in construction even though it has diverse functions as described hereinbefore.

Operation of the tape delivery mechanism and the cutting device may be controlled by a single solenoid since the cutter device is arranged relative to the tape delivering mechanism such that the cutter blade is swung up simultaneously with the starting of the delivery mechanism to be held in the upper position and released to start cutting motion at the end of the set time period. This makes the sequence of the tape delivering and subsequent tape cutting operation smooth and rapid.

It will of course be apparent to those skilled in the art that the invention is not restricted to the features described above and shown in the drawings but may be varied in many ways within the scope of the appendant claims to suit the conditions of a particular use.

What is claimed is:

1. A tape dispensing mechanism comprising a tape driving means for driving a tape along a path, a tape cutting means lying along the path of the tape, a tape biasing means for processing the tape against the tape driving means so that the tape is driven by the tape driving means, an actuating member coupled between said tape cutting means and said tape biasing means and movable from a position in which the biasing means acts on the tape to bias it and the cutting means is out of the path of the tape to a position in which the biasing means is spaced from the tape and the cutting means cuts the tape, an actuating solenoid coupled to said actuating means for moving said actuating means from the cutting position of said tape cutting means to the biasing position of said biasing means, spring means engaged with said actuating means for moving said actuating means in the opposite direction from said solenoid means, and a control circuit in which said solenoid is coupled, said control circuit consisting essentially of a power supply, a power relay coupled between the power supply and the solenoid, a plurality of resistances each adapted to have a different resistance value, a capacitance, an amplifier circuit, a plurality of control relays, one side of the capacitor and the energizing coil for the power relay and the amplifier circuit being coupled in series, and the respective resistances and the control relays therefor being coupled in parallel between the other side of the capacitor and the amplifier circuit and the control relays having arms coupled in parallel between the amplifier and the power supply and arms interconnected with the power relay in holding circuits and arms interconnected with the other control relays in disconnect circuits for the other relays, whereby the capacitor is charged by being coupled by one of the control relays to the power supply through one of the resistances depending on the value of the resistance, and the energizing coil of the power relay is energized for a time which depends on the changing time of the capacitor, so that the solenoid is energized for a different time depending on which control relay is closed, and different lengths of tape are dispensed depending on the time the solenoid is energized.

2. A tape dispensing mechanism comprising a tape driving means for driving a tape along a path, a tape cutting means lying along the path of the tape, a tape biasing means for pressing the tape against the tape driving means so that the tape is driven by the tape driving means, an actuating member coupled between said tape cutting means and said tape biasing means and movable from a position in which the biasing means acts on the tape to bias it and the cutting means is out of the path of the tape to a position in which the biasing means is spaced from the tape and the cutting means cuts the tape, an actuating solenoid coupled to said actuating means for moving said actuating means from the cutting position of said tape cutting means to the biasing position of said biasing means, spring means engaged with said actuating means for moving said actuating means in the opposite direction from said solenoid means, and a control circuit in which said solenoid is coupled, said control circuit consisting essentially of a power supply, a two arm power relay having one arm connected across the power supply and the solenoid, a plurality of resistances each adapted to have a different resistance value, a capacitance to one side of which said resistances are connected in parallel, an amplifier circuit coupled to the other side of said capacitor, a plurality of control relays corresponding in number to the number of said resistances and each having a plurality of arms, one of which is connected across the other side of the respective resistance to which the relay corresponds and the amplifier circuit, a second of which is connected across said power supply and said amplifier circuit, a third of which is coupled between the other arm of the power relay and through the energizing coil for the respective relay to the power supply, said first, second and third arms of the control relays being normally open, and at least a fourth arm which is normally in the closed position and which is interconnected with the third arms of the other control relays, the other relay arm of the power relay being coupled to the power supply, a plurality of energizing switches the same in number as the number of control relays connected with the fourth arm of the respective relay and the power supply, and the energizing coil for the power relay being coupled between the other side of the capacitor and the amplifier circuit, whereby the capacitor is charged by being coupled by one of the control relays to the power supply through one of the resistances depending on the value of the resistance, and the energizing coil of the power relay is energized for a time which depends on the charging time of the capacitor, so that the solenoid is energized for a different time depending on which control relay is closed, and different lengths of tape are dispensed depending on the time the solenoid is energized.

3. A tape dispensing mechanism as claimed in claim 2 and a switched circuit in parallel with the one arm of the power relay for energizing the solenoid independently of the remainder of the control circuit for dispensing lengths of tape without automatic control thereof.

4. A tape dispensing mechanism as claimed in claim 2, in which said resistances are variable resistances.

References Cited by the Examiner

UNITED STATES PATENTS

| | | | |
|---|---|---|---|
| 2,333,109 | 11/43 | Krueger et al. | 83—261 X |
| 2,393,845 | 1/46 | Wagner et al. | 83—169 |
| 2,408,363 | 10/46 | Beckman et al. | 83—243 |
| 2,767,981 | 10/56 | Hempel | 83—243 |
| 2,810,437 | 10/57 | Hoitt | 83—261 X |
| 2,892,500 | 6/59 | Le Baron et al. | 83—243 |
| 3,063,322 | 11/62 | Thomas | 83—587 |

WILLIAM W. DYER, *Primary Examiner.*